Oct. 16, 1934. N. F. McNAUGHT ET AL Re. 19,341

RATCHET WRENCH AND METHOD OF MAKING THE SAME

Original Filed June 16, 1932

Inventors:
Norris F. McNaught
Edward H. Peterson
By Williams, Bradbury,
McCaleb & Hinkle
Attys Reissued Oct. 16, 1934

Re. 19,341

UNITED STATES PATENT OFFICE 19,341

RATCHET WRENCH AND METHOD OF MAKING THE SAME

Norris F. McNaught and Edward H. Peterson, Chicago, Ill., assignors to Duro Metal Products Company, Chicago, Ill., a corporation of Illinois Original No. 1,902,878, dated March 28, 1933, Serial No. 617,522, June 16, 1932. Application for reissue January 18, 1934, Serial No. 707,155

5 Claims. (Cl. 76—114)

Our invention relates to a ratchet wrench and method of making the same,—the principal object of the invention being to provide a ratchet wrench which comprises relatively few parts which are completely and permanently assembled in co-operating relationship without the employment of screws, rivets or the like.

A coordinate object is to so form the wrench that it will be completed in its assembled form and its component parts secured in position by a single compressing operation.

In the accompanying drawing illustrating a preferred embodiment of our invention, Fig. 1 is a side elevational view of the larger end of a drop forging constituting one of the elements of our improved tool;

Fig. 2 is a section taken on the line 2—2 of Fig. 1 and looking in the direction indicated by the arrows;

Fig. 3 separately illustrates in side elevation the several elements which are intended to be assembled with the aforesaid forging in the manufacture of our improved ratchet wrench;

Fig. 5 is a view partly in section and partly in elevation, illustrating how the flanges of the forging head are caused to cooperate with the side plates to hold the several elements of the wrench in cooperating relationship without the use of rivets, screws or the like.

Similar characters of reference refer to similar parts throughout the several views.

Figure 1:
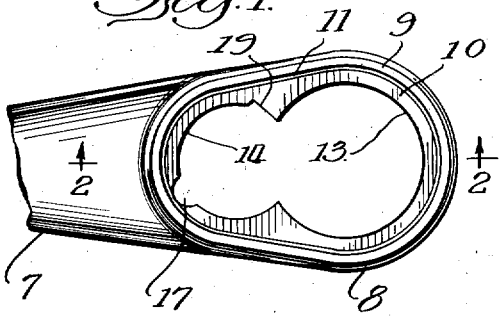
Figure 2:
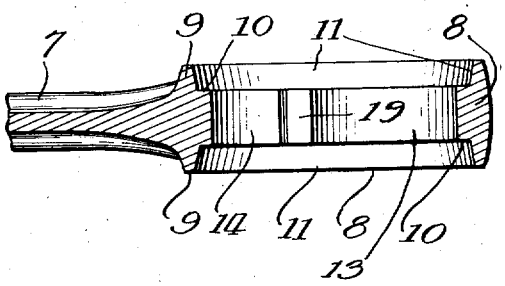
Figure 3:
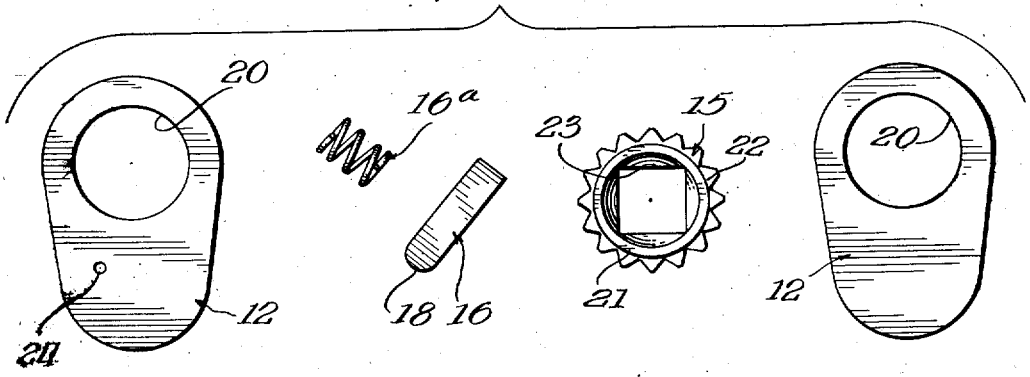

Our improved wrench includes an integral drop forging having a handle part 7 and the head 8. On its side faces the forging head 8 is provided with symmetrical contiguous flanges 9—9 which border and project outwardly substantial distances from the parallel side plate seats 10—10. The inner surfaces 11 of the flanges 9—9 flare slightly away from their respective seats 10—10, said inner surfaces 11—11 of the flanges being arranged snugly to embrace the side plates 12—12 when the latter are assembled on their respective seats 10—10.

The forging head is provided with intersecting larger and smaller bores 13 and 14, the larger of these bores being adapted freely to receive the socket-ratchet element 15, and the smaller of the bores being intended to accommodate the ratchet dog 16 and its spring 16—*a*. The better to accommodate the ratchet dog 16 the wall of the bore 14 is provided with a semi-cylindrical seat 17 (to receive the pivoted rounded end 18 of the dog) and with a plane faced notch 19 to accommodate the movements of the ratcheting end of the dog.

The side plates 12—12 are provided with circular apertures 20—20 adapted to receive and journal the cylindrical extremities 21—21 of the socket-ratchet member 15. The said socket-ratchet element is also provided on its outer surface, intermediate its cylindrical extremities 21—21, with the ratchet teeth 22 and, axially, with the square or other polygonal socket 23, which preferably extends entirely through the socket-ratchet element from end to end. One of the pair of symmetrical side plates 12—12 is conveniently provided with a small aperture 24 through which oil may be injected to the working parts of the wrench after the several parts have been completely and permanently assembled in the manner presently to be described.

Figure 4:
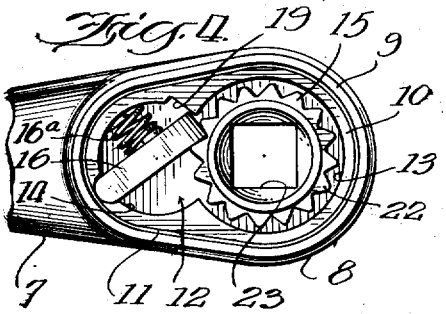
Fig. 4 is a view similar to Fig. 1 but showing the socket-ratchet, its dog and cooperating spring, and one of the wrench side plates applied to the head of the handle forging.
Figure 5:
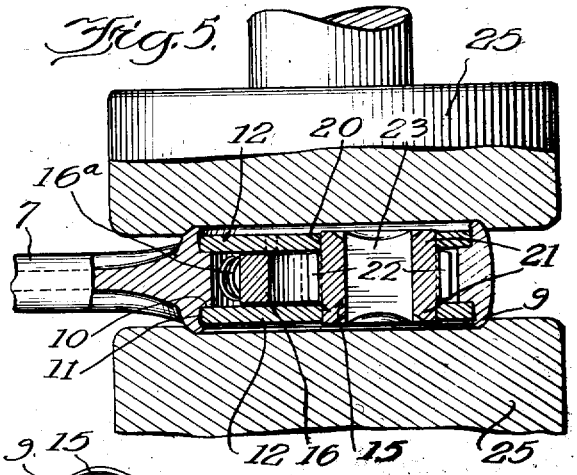
Figure 6:
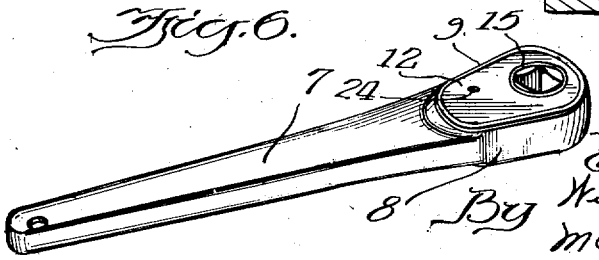
Fig. 6 is a view in perspective of the completed wrench.

The assembly of the several parts of the wrench is effected as illustrated in Figs. 4 and 5,—the socket-ratchet element 15 occupying the forging head bore 13, the dog 16 occupying the forging bore 14 (and particularly the seat 17 and notch 19 thereof), the dog spring 16—*a* being confined between the dog and that portion of the bore 14 whereof the dog 16 is a chord, and the side plates 12—12 lying within the flanges 9—9, resting on seats 10—10, and serving to journal the cylindrical extremities 21—21 of the socket-ratchet element 15.

With the several parts of the wrench assembled as just described, and as illustrated in Figs. 4 and 5, the wrench head is inserted between and operated upon by opposed female dies 25—25, each of said dies being provided with outwardly flaring recesses adapted to receive the flanges 9—9 of the wrench head and to force the said flanges against the edges and over the outer margins of the side plates 12—12 firmly and permanently to hold the said side plates against their respective seats 10—10 without any necessity for the employment of rivets, screws or the like to accomplish such purpose (see Fig. 5).

The dog 16 and its spring 16—*a* cooperate with the teeth 22—22 of the socket-ratchet member in a well known manner.

Having thus illustrated and described a preferred embodiment of our invention, as well as the preferred manner of producing the same, what we claim is new and desire to secure by Letters Patent of the United States is:

1. A ratchet wrench comprising a handle member having an opening extending through it at the end thereof for the reception of a socket-ratchet member, a pawl and a spring bearing thereagainst, flanges on each side of the handle member extending in opposite directions and circumscribing said opening, seats occupying parallel planes within the confines of the respective flanges and extending between said opening and the bases of said flanges, side plates resting against said seats and accurately lying within the embrace of said flanges, the thickness of said side plates being less than the height of said respective flanges, a socket ratchet occupying said opening and confined therein by said side plates for coaction with said pawl, said socket ratchet having cylindrical extremities, said side plates having opposed, aligned circular apertures which receive and constitute bearings for the cylindrical extremities of the socket ratchet member, the outer edges of said flanges in the finished article overhanging and contacting the outer margins of said side plates firmly and permanently to retain the several parts of the wrench in assembled relation.

2. A ratchet wrench comprising a handle member having an opening extending through it at the end thereof for the reception of a socket-ratchet member, a pawl and a spring bearing thereagainst, flanges on each side of the handle member extending in opposite directions and located adjacent to said opening, seats occupying parallel planes within the confines of the respective flanges and extending between said opening and the bases of said flanges, side plates resting against said seats and lying within the embrace of said flanges, said flanges projecting sufficiently to engage and secure said side plates, a socket-ratchet occupying said opening and confined therein by said side plates for coaction with said pawl, said socket ratchet having cylindrical extremities, said side plates having opposed, aligned circular apertures which receive and constitute bearings for the cylindrical extremities of the socket-ratchet member, the outer parts of said flanges in the finished article engaging the outer edges of said side plates firmly and permanently to retain the several parts of the wrench in assembled relation.

3. A ratchet wrench comprising a drop forging formed with a handle portion and with an enlarged head portion, said head portion having an opening extending through the head portion at one end of said ratchet wrench for the reception of a socket-ratchet member, a pawl and a spring bearing against said pawl, said head portion having laterally projecting flanges on each side of the head portion extending in opposite directions and spaced from said opening but located adjacent thereto, said head portion having an oppositely located seat on each side, said seats being in parallel planes and extending between said opening and the bases of said flanges, said flanges projecting outside of said seats, side plates engaging against said seats and having their edges located adjacent said flanges, the height of said flanges being sufficient to engage outside a part of said side plates, a socket-ratchet located in said opening and confined by said side plates for co-action with said pawl, said socket-ratchet having cylindrical extremities forming trunnions for said socket-ratchet, and said side plates having opposed aligned circular apertures receiving and forming bearings for the cylindrical extremities of the socket-ratchet member, and integral parts of said flanges in the finished article overhanging and contacting parts of said side plates firmly and permanently to secure the side plates against said seats, and to retain the several parts of the wrench in assembled relation.

4. The method of making a ratchet wrench which consists in drop-forging a metal body member having a handle portion and an enlarged head portion, said head portion having an opening extending through the same with flanges adjacent to said opening on each side of said head portion and side plate seats located between said opening and the bases of said flanges; forming a socket-ratchet member having cylindrical extremities, forming a pair of apertured side plates adapted to fit within the embrace of said flanges and to rest against said seats, inserting the socket-ratchet member and its pawl and spring into said opening; applying the side plates to said seats with the side plate apertures in alignment with each other, receiving and constituting bearings for the cylindrical extremities of the socket-ratchet member; and then simultaneously forcing the flanges on each side of said enlarged head portion against the adjacent edges of the side plates firmly and permanently to engage the side plates and to retain the several elements of the wrench in assembled relationship.

5. A ratchet wrench comprising a metal member formed with a handle portion and with an enlarged head portion, said head portion having an opening extending through the same at one end of said ratchet wrench for the reception of a socket-ratchet member, a pawl engaging said socket-ratchet member, and a spring bearing against said pawl and urging it into engagement with said socket-ratchet member, said head portion having laterally projecting flanges on each side of the head portion extending in opposite directions and spaced from the opening but located adjacent thereto, said head portion having an oppositely located seat on each side, said seats being in parallel planes and extending between said opening and the bases of said flanges, said flanges projecting outside of said seats and being adapted to locate certain side plates, side plates engaging against said seats and having their edges located against said flanges, a socket-ratchet member located in said opening and confined by said side plates for coaction with said pawl, said socket-ratchet having cylindrical extremities forming trunnions for said socket-ratchet, and said side plates having opposed aligned circular apertures receiving and forming bearings for the cylindrical extremities of the socket-ratchet member, and means for securing said side plates in engagement with said seats inside said flanges to retain the several parts of the wrench in assembled relation.

NORRIS F. McNAUGHT.
EDWARD H. PETERSON.